United States Patent Office 3,330,957
Patented July 11, 1967

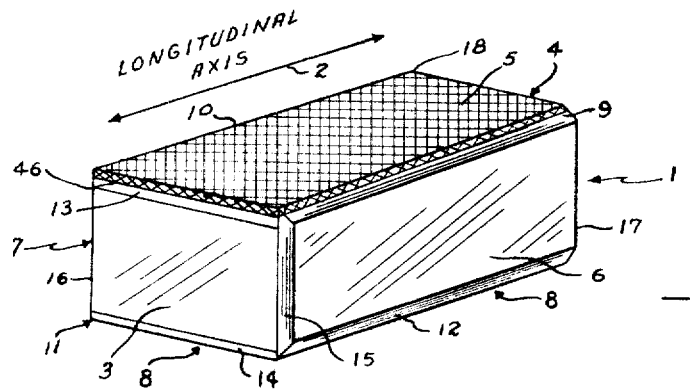
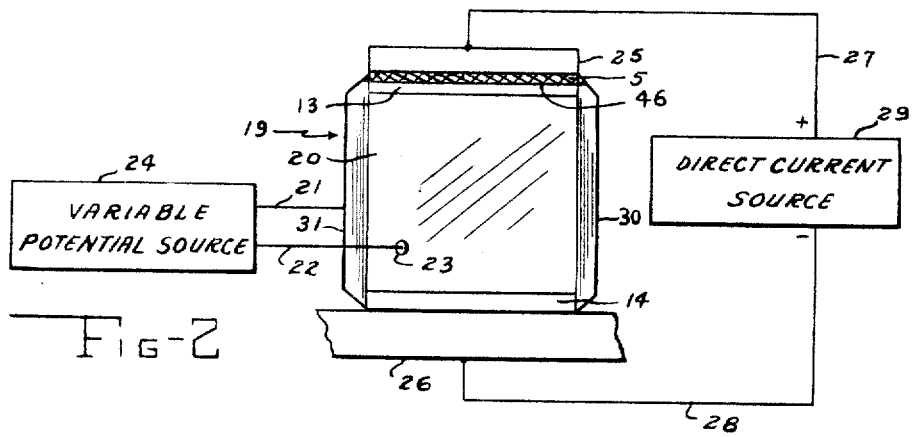
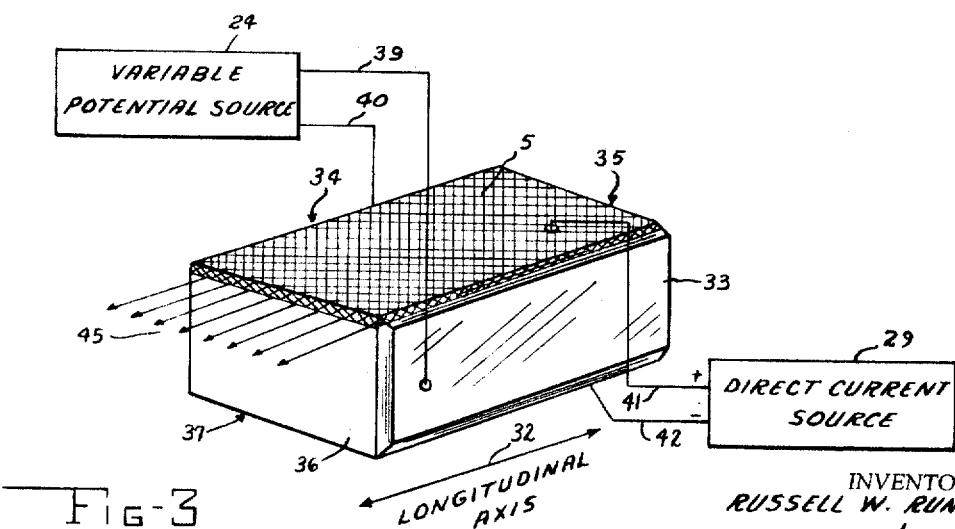
Fig-1
Fig-2
Fig-3
INVENTOR.
RUSSELL W. RUNNELS

3,330,957
PIEZOELECTRIC FREQUENCY MODULATED
OPTICAL MASER
Russell W. Runnels, Wilmington, Ohio, assignor to the United States of America as represented by the Secretary of the Air Force
Filed Sept. 19, 1963, Ser. No. 310,179
2 Claims. (Cl. 250—199)

The invention described herein may be manufactured and used by or for the United States Government for governmental purposes without payment to me of any royalty thereon.

This invention relates to frequency variable optical masers and, more particularly, to optical masers that can be frequency modulated by the utilization of the piezoelectric effect.

The terms "optical maser" and "laser" are frequently used interchangeably; therefore, when the term optical maser appears herein it is to be understood that the term laser equally applies. Optical masers have been constructed primarily from three different types of active materials: the solid or ionic type, of which chromium, zinc, neodymium, and uranium are examples of the many materials; the gas-discharge type of which neon and xenon are typical examples; and, the semi-conductor injection type, gallium arsenide and indium phosphide being common examples. These optical masers are activated to an excited state by: being optically pumped, an electric discharge, or by the pump energy being supplied by injecting charge carriers (electrons), electrically, into the semiconductor diode.

In order to convey a greater amount of intelligence than can be conveyed by either a continuous or pulsed beam, it is desirable to modulate the radiation emission emanating from the optical maser. Semiconductor diode optical masers have been modulated by modulating the input current source to the diode junction. This results in a modulation of the electron-hole pairs in the diode junction. The electron-hole pairs radiate energy in the optical spectrum during recombination. Thus, the emitted radiation is modulated, predominately in an amplitude mode. The current source that is modulated has to supply a current density at the diode junction of the order of $10^4$ to $10^8$ amperes per square centimeter.

Many of the materials used in optical masers have piezoelectric characteristics, particularly if the material is cut or formed to take advantage of this property.

In the conventional optical maser the end surfaces, from at least one of which useful radiation is taken, are made plane parallel and function as a mode isolator. This action is quite similar to a cavity resonance action. The length of the bar of material constituting the maser between the plane parallel surfaces corresponds to an integral number of half-wavelengths of the transmitted energy. By changing the physical length of the bar, as this invention teaches, the frequency of the transmitted beam of energy may be varied, or a frequency modulation of the beam may be obtained. It is to be noted that if the radiation generated within the optical maser were perfectly coherent so as to be constituted of but one single frequency, frequency modulation by changing the resonant frequency of the mode isolator could not be produced. The light energy in an optical maser is not perfectly coherent, but consists of a relatively narrow band of frequencies. The predominant frequency radiated is that frequency in resonance with the mode established by the physical length of the optical maser bar.

In this invention, the length of the optical maser bar is made variable by energizing the piezoelectric effect within the bar through the application of a potential to the proper surfaces of the bar. By this action the predominant radiated frequency may be shifted, or a frequency modulation of the optical maser beam obtained with a relatively small amount of modulation power.

An object of the present invention is to provide an optical maser with a predominant output frequency that is electrically variable.

Another object is to provide an optical maser that can be frequency modulated.

Various other objects and advantages will appear from the following description of the embodiments of the invention shown, and the novel features will be particularly pointed out hereinafter in the appended claims.

FIG. 1 illustrates a piezoelectric gallium-arsenide crystal constructed in accordance with this invention.

FIG. 2 illustrates a gallium-arsenide optical maser with electrical contacts for piezoelectric control on faces normal to the longitudinal axis.

FIG. 3 illustrates a gallium-arsenide optical maser with electrical contacts for piezoelectric control on faces parallel to the longitudinal axis.

Referring more particularly to FIGURE 1, a crystal bar 1 of gallium-arsenide doped with an impurity so as to be of the n-type is cleaved along its crystalline axes so as to provide greatest piezoelectric action along its longitudinal axis 2. End faces 3 and 4 are lapped and polished to a plane parallel condition. A p-type layer 5 is created by the vapor diffusion or epitaxial layer process on the upper face of the crystal. The depth of the layer is made approximately one micron. (It is not shown to scale.) The bar is mechanically lapped and optically polished on all four sides, sufficient to eliminate any layer that formed on three of the four sides, but not eliminating the layer 5 on the top side. A highly reflective material, such as aluminum, is deposited over the surface of the diode layer 5, and the other three sides 6, 7 and 8. The side reflecting surfaces retain the light energy within the crystal improving the build-up of optical maser action with in the crystal. The four edges 9, 10, 11, and 12 are beveled a few thousandths of an inch at approximately 45 degrees, electrically insulating the four surfaces one from another.

The end surfaces 3 and 4 of the crystal bar are further polished, maintaining their plane parallel condition. In order for the stimulated radiation to build up, it is desirable that a relatively large portion of the radiation be contained within the crystal; typical values being in the range of 80% to 90% of the emission being contained and 10% to 20% being radiated external to the optical maser. The external radiation from the crystal bar of gallium-arsenide occurs from the boundary junction 46 of the p-type layer 5 and the n-type crystal. The beveled edges 9 and 10 prevent the effective build-up of radiation at the junction layer transverse to the longitudinal axis and, in addition, provide electrical isolation. Highly polished surfaces on the end faces 3 and 4 of the crystal are often sufficiently reflective to provide optical maser operation. An increase in optical maser efficiency can frequently be obtained by coating the end faces of the crystal with a reflective material. Conductive coatings such as aluminum, nickel, tin, and gold or dielectric coatings such as silicon oxide and magnesium oxide are used. The coating over the p-type layer 5 and the coating on the opposite side 8 must be conductive so that electrical connections, for the excitation current, may be made to these faces. When the crystal structure determining the piezoelectric action makes it advantageous to make the electrical contacts on end faces 3 and 4 to achieve piezoelectric action along longitudinal axis 2, these faces must be coated with a conductive material. This conductive material, in addition to providing a way to induce an electrical signal, provides a reflective coating enhancing the optical maser action. However, the areas 13 and the corresponding area at the top of face 4 (not shown) containing the junction should be masked during the coating process to prevent the conductive material extending over them. The bottom of the front face 14 and a similar area, not shown, on the rear face 4 should also be masked, or beveled, to prevent electrical continuity between the piezoelectric excitation source and the optical maser excitation source. The crystal sides 6 and 7 may be coated with either a conductive or dielectric reflective material. An optical maser constructed from a crystal element fabricated in this manner is shown in FIGURE 2.

For crystals cleaved such that electrical contacts for piezoelectric activity are to be made on faces parallel to the longitudinal axis of piezoelectric motion, the end faces 3 and 4 may be left in a highly polished condition, or in addition may be coated over completely, to the desired degree of reflectivity, with a dielectric reflective material. The side faces 6 and 7 are coated with a conductive material suitable for making external electrical connection; this material also acting as a reflective coating improving the optical maser efficiency of the crystal. If radiation is desired only from one end face, such as 3, the opposite face 4 is coated over completely with a dielectric reflective coating of such density as to give approximately total reflection. The face 3 is coated with a partial reflective coating permitting 10% to 15% of the radiant energy to pass through the coating.

After coating the surfaces as previously set forth, side edges 9, 10, 11, and 12, and end edges 15, 16, 17, and 18 are beveled, electrically insulating all surfaces. It is to be noted that common edges abutting the plane parallel end faces 3 and 4 and the top face containing the diode junction 5 are not beveled, and when end faces 3 and 4 are given a dielectric coating, the bottom edges do not need to be either masked or beveled.

FIGURE 2 illustrates an end view of a gallium-arsenide optical maser 19 with major emission radiating from the front edge of diode junction 46 and the corresponding rear edge of the junction (not shown). Front face 20 and corresponding plane parallel rear face have vapor-deposited tin coatings covering their surfaces except for areas 13, 14, and corresponding areas on the rear face. The figure, for explanatory purposes, is not drawn to scale. The p-type layer 5 is approximately one micron in thickness and the uncoated areas 13 and 14 and the corresponding opposite uncoated areas are only of sufficient width to prevent electrical arcing-over of the piezoelectric potential; a few thousandths of an inch is generally sufficient. Conductors 21 and 22 are soldered to the tin coatings as shown at 23. The position of the soldered attachment of the conductors is not critical. Electrical source 24 supplies the potential to energize the piezoelectric property of the crystal.

Metallic contact element 25 conducts the optical maser excitation current to one side of the p-n junction and metallic element 26 contacts the other side of the junction. Large contacting elements aid in radiating heat away from the optical maser into the medium in which it is operated. This crystal, as described, will operate satisfactorily in air at or near room temperature, radiating with a central wavelength of approximately 8800 angstroms. As the temperature of the medium is lowered, higher excitation powers may generally be used with a corresponding increase in emission. Electrical conductors 27 and 28 connect the excitation source 29 to the crystal contactors. Slides 30 and 31 of the crystal have reflective coatings of vapor-deposited tin.

The piezoelectric optical maser embodiment shown in FIGURE 3 is constructed from a single crystal of n-type gallium-arsenide, cleaved to produce piezoelectric motion along longitudinal axis 32 when electrical energy is applied on faces 33 and 34. A p-type layer 5 is formed by the vapor-diffusion process on the top face of the crystal. To provide radiation from one end only, end face 35 is coated with a totally reflective dielectric of silicon oxide, prohibiting radiation from that face. Face 36 is coated with a coating of silicon oxide of such a density as to give approximately 85 percent internal reflection. Faces 33, 34, 37, and p-type layer 5 are coated with a conductive, reflective, metallized layer of aluminum followed by a metallized layer of tin, to which conductors 39, 40, 41, and 42 are soldered. Electrical source 29 is a direct current source supplying a forward bias excitation to the diode junction of the magnitude of $10^4$ to $10^8$ amperes per square centimeter. The amount of excitation current that may be used is dependent upon the temperature at which the optical maser crystal is maintained; which is dependent upon the environment in which it is operated, the geometry of the crystal, and the ability of any supporting structures to operate as heat sinks. The electrical source 24 for creating the piezoelectric action may be simply a source of variable potential for shifting the frequency of the emitted radiation through the piezoelectric effect of the crystal as already explained. For modulated output of the optical maser, with for example an audio frequency, 24 may be a modulator device such as an amplifier system commonly used to drive an electrostatic loud speaker with its associated preamplifier and signal input source. In any event, the radiated beam 45 of the optical maser is frequency controlled in accordance with the voltage applied to its faces 33 and 34 from source 24.

It will be understood that various changes in the details, materials, steps and arrangement of parts, which have been herein described and illustrated in order to explain the nature of the invention, may be made by those skilled in the art without departing from the principle and scope of the invention as expressed in the appended claims.

What is claimed is:
1. A variable frequency optical maser comprising:
 (a) a unitary semiconductive crystal body having piezoelectric properties and including opposing reflective parallel surfaces oriented normal to a longitudinal axis which extends between said surfaces;
 (b) semiconductive layered means having a type conductivity opposite to the type conductivity of said crystal, said layered means extending over an external surface of said crystal normal to said reflective surfaces and in a plane parallel to said axis, whereby a p-n junction is formed between said layered means and said crystal body;
 (c) ohmic contact means electrically coupled to said layered means and said crystal body for controlling the level of stimulated radiation emitting from said crystal body; and
 (d) means for applying an alternating electrical charge to opposing sides of said crystal body, perpendicular to said axis, whereby a physical expansion and contraction of the axial dimension of said crystal body frequency modulates the wave length of said radiated emission at a cyclic rate.
2. A variable frequency optical maser comprising:
 (a) a piezoelectric semiconductive body of one type conductivity capable of being piezoelectrically stressed upon the application of an electrical charge thereto;
 (b) said body including opposing reflective parallel surfaces oriented normal to a longitudinal axis which extends in the direction of emitted radiation from said body;
 (c) epitaxial layer means of a type conductivity opposite to the type conductivity of said body contiguous with and extending substantially fully the length of one external surface of said body parallel to said axis, thereby forming a rectifying p-n junction in the region intermediate said body and said epitaxial layer means;
 (d) ohmic contact means electrically coupled to said epitaxial layer means and said body for applying a direct current sufficient to adjust the level of said emitted radiation; and
 (e) means coupled to said sides of said body, perpendicular to said axis, for applying an alternating charge to said body whereby the output frequency of said emitted radiation is determined according to the mechanical expansion and contraction of said body.

References Cited

UNITED STATES PATENTS

| 2,463,109 | 3/1949 | Jaffe | 88—61 |
| 3,059,117 | 10/1962 | Boyle et al. | 250—199 X |
| 3,166,673 | 1/1965 | Vickery et al. | 250—199 |
| 3,240,962 | 3/1966 | White | 310—8 |
| 3,243,722 | 3/1966 | Billings | 250—199 X |
| 3,245,002 | 4/1966 | Hall. | |

OTHER REFERENCES

Barnes: Proc. I.R.E., vol. 50, No. 7, July 1962, pp. 1686, 1687.

Burnett: Electronic Industries, vol. 21, No. 11, November 1962, pp. 90–95.

Keyes et al.: Proc. I.R.E., vol. 50, No. 8, August 1962, pp. 1822–1824.

Smith: Phy. Rev., vol. 94, No. 1, Apr. 1, 1954, pp. 42–49.

JOHN W. CALDWELL, *Acting Primary Examiner.*